United States Patent [19]

Liew

[11] Patent Number: 4,738,524

[45] Date of Patent: Apr. 19, 1988

[54] DETACHABLE MOTOR WINDER FOR MEDIUM FORMAT CAMERAS

[76] Inventor: Chewa W. Liew, 57-04-08 Rumah Pangsa, Bandar Baru Sentul, Kuala Lumpur, Malaysia

[21] Appl. No.: 73,020

[22] Filed: Jul. 14, 1987

[30] Foreign Application Priority Data

Jul. 21, 1986 [GB] United Kingdom ................ 8617734

[51] Int. Cl.⁴ .......................... G03B 1/12; G03B 17/02
[52] U.S. Cl. ................................... 354/173.1; 354/288
[58] Field of Search ............................. 354/173.1, 288

[56] References Cited

U.S. PATENT DOCUMENTS

4,657,365 4/1987 Adelman .......................... 354/173.1

*Primary Examiner*—Michael L. Gellner
*Attorney, Agent, or Firm*—Toren, McGeady & Associates

[57] ABSTRACT

An add-on detachable electronic/mechanical motor-winder arranged for use with a camera having a manually operable winding mechanism and shutter release, the winder comprising a generally rectangular body, for example an anatomical I- or L-shaped hand grip, which is adapted to be connected to the camera surface provided with the winding mechanism and a circular opening surrounding the winding mechanism and an adjacent strap lug. The body is arranged to be mounted flush to the surface of the camera body and is held by the operator for stably supporting the camera in use. The boyd houses a simple, highly efficient drive assembly for enabling the winding of film. An electromechanically or mechanically operable actuator is arranged to operate the camera manual shutter release mechanism, and the body further includes a battery compartment, electric/electronic circuitry for controlling operation of the winder, and a manually operable control button for operating the drive assembly and actuator.

15 Claims, 13 Drawing Sheets

DETACHABLE MOTOR WINDER FOR MEDIUM FORMAT CAMERAS

BACKGROUND OF THE INVENTION

1. Field of the Invention

The present invention relates to an add-on/detachable motor winder for a manually operable camera, and more particularly, to a winder for a manually operable 6×6 medium format camera, such as the Hasselblad models 500c and 500c/m.

2. Description of Related Art

Camera motor winders and drives became well-known in the early 1960's, after which most professional and amateur 35 mm and only some medium format 6×6 cm cameras were designed with provisions for motor winders or drives couplable to the camera. However, cameras designed in the 1950's were basically manually operated. Motor drives or winders were novel and not practiced, and especially in the area of the 6×6 cm medium format cameras like the Hasselblad models 500c and 500c/m, had no provision for motor winder/drive couplability. These cameras have since remained basically unchanged up to the present time.

The above professional Hasselblad 500c and 500c/m cameras are full-manual types, i.e. manual film advance, mirror and shutter charging, etc. The manufacturers of these types of cameras do not or have not been able to supply a suitable, practical "add-on" motor winder for these cameras. However, motorized operation has been introduced into the camera line of Hasselblad by yet another different model, e.g. 500EL, 500EL/M or the latest 500ELX, which are based on the "manual only" model 500c/m, but with a motorized compartment box integrated at the base thereof as a single unit.

These motorized cameras have not been completely satisfactory due to the overall size of the cameras being bulky making the holding and handling thereof awkward, especially when the camera is combined with various other attachments, for example an electronic flash device. Another drawback for these motorized cameras is that there is no manual over-ride of the motor-driven functions in the event of battery failure.

At Photo '85, the Photo-District News show for professionals held in New York in November, 1985, a motor winder attachment, notably the Prowinder 500, was offered as an add-on feature for Hasselblad 500c/m cameras, for advancing the film by a contained motor. This winder is similar to the Mamiya 645 power winder. The Prowinder 500's overall configuration is a rigid L-shape, consisting of a handle part, in which is located the coupling connections to the camera film winding mechanism, and a large rectangular base compartment for locking the winder to the camera's tripod socket. This base compartment holds the batteries, electric motor and reduction gear system and as such, necessarily increases the bulk and height of the camera, which, unfortunately, inconveniences the focusing of the lenses attached to the camera body (the camera being designed such that focusing may be easily adjusted by the photographer's left hand while the camera is being held in that hand). The weight of the base compartment of this winder adds more weight to camera and relocates the center of gravity of the camera thereby adding greater pivotal moments at the handle part. In addition, the indirect nature of gearing and coupling to the Hasselblad 500c/m camera makes the winder configuration undesirably complicated, relatively inefficient and unaesthetical. Moreover, this winder has no other provisions for operating other useful features of the 500c/m cameras other than the film winding and mirror/shutter charging.

SUMMARY OF THE INVENTION

An object of the present invention is to overcome the above noted disadvantages. According to the present invention, there is provided a detachable motor winder arranged for use with a camera having a manually operable film winding mechanism and shutter release, the winder comprising a generally rectangular body adapted to be connected to the surface of the camera provided with the winding mechanism, so that a major portion of one side of the winder body is flush with the camera surface. The body of the winder is arranged to be held by the operator for stably supporting the camera in use, whereby to give improved handling characteristics for the camera, the generally rectangular body, housing a drive assembly arranged to be coupled to the camera winding mechanism for enabling the winding of film, a mechanically or electromechanically operable actuator arranged to operate the camera's manual shutter release mechanism, a battery compartment, electric circuitry for controlling the start/stop operation of the winder, and a manually operable control button for operating the drive assembly and actuator.

When the winder is attached to the camera, a smooth integrated unit of the camera and the winder assembly is advantageously achieved which is more effective, practical and versatile, having relatively much better balance and handling, and better ergonomics and aesthetics, and which does not significantly contribute to the moments of the camera center of gravity when held by the handle of the winder in use, by virtue of the general shape of the winder and its attachment to the camera body.

Preferably, the mechanically or electromechanically operable actuator is an L-shaped arm which extends from the winder body and is arranged to operate the camera shutter release button on operation of levers or a solenoid. The length of the arm is preferably adjustable or the arm is interchangeable for different lengths. The arm is preferably mounted on the side of the winder body which is flush with the camera. The adjustability and/or interchangeability of the arms allows the winder to be used with either a standard positioned camera shutter release button or with a somewhat modified camera body and a modified improved shutter release button, with the mechanical L-shaped arm being located at the near side of the camera body shutter release to the winder, or may be at the underside of the camera near the shutter release button.

The drive assembly comprises an electric motor, reduction gearing and an adaptor, the adaptor being arranged to lockably engage with the camera film winding mechanism in order to enable film to be wound and to attach the side of the body of the winder to the camera surface.

BRIEF DESCRIPTION OF THE DRAWINGS

A specific embodiment of the invention will now be described by way of example, with reference to the accompanying drawings, in which.

DESCRIPTION OF THE PREFERRED EMBODIMENT

Referring to the drawings, the winder 10 is of a one-piece I-shaped anatomically designed handle to fit the right hand for a right-handed hold, and is made, for example, of strong, lightweight die-cast aluminum, strong plastic or similar materials. The winder 10 attaches to the camera film winding mechanism 3-claw bayonet 36 in the same manner as the standard interchangeable winding knob or the rapid winding crank via the compatible bayonet plate 26, simultaneously engaging the raised circular ring 56 on the winder plate 57 into the camera body opening 17 for the winding mechanism. The ring 56 should have a very snug fit with the camera opening 17 thus ensuring good centering of the drive transmission from the winder to the camera, providing good lateral support from the winder to the camera and assisting positively in the good attachment, and simultaneous locking the contoured keyhole 44 of the winder plate 57 to the camera strap-lug with an approximately 20 degree clockwise turn. It should be understood that the keyhole 44 could be exchanged for other means which would securely hold the lug, such as a hook arrangement, for example, and the lug could be any projection on the surface of the camera, not necessarily the camera strap lug.

In order to secure the winder in place to the camera 18 at 32 about the strap lug 23, a screw button 50 is positionable to prevent the strap lug 23 from moving out of its determined position. The retraction of the screw button 50 will allow the winder to be detached from the camera while holding the lever 49 in the direction of arrow 48 engaging into the large gear 24 both during attaching and detaching procedures with the index aligned.

Figure 15:
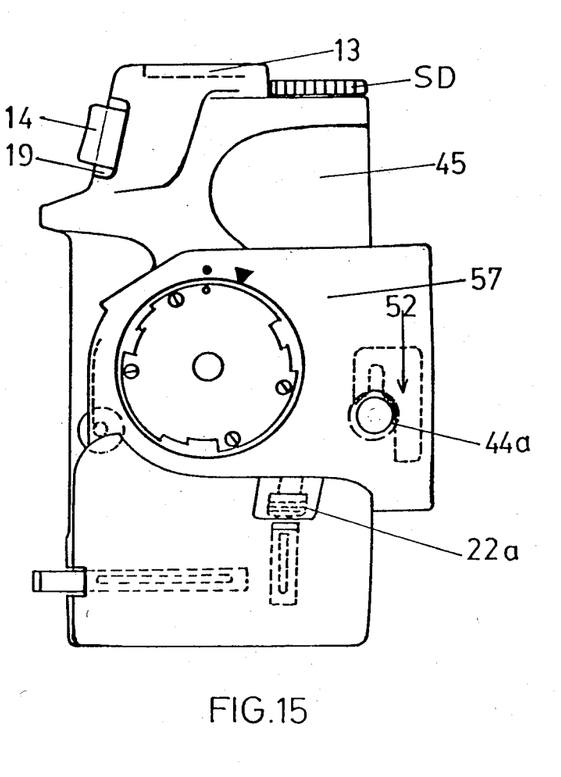
FIG. 15 is similar to FIG. 14 but with a different body configuration, the index for mounting or detaching and also illustrates the adjustability of the trigger arm for the longer pre-release lever of a different version of the camera.

Another variation is shown in FIG. 15, the lock of the key plate in the direction of arrow 52 to engage into the strap lug 23 at the opening 44a of the winder plate 57. The winder 10 has its own strap lug 23a for attachment of a neck strap to replace the strap lug 23 being used to attach the winder 10.

Figure 11:
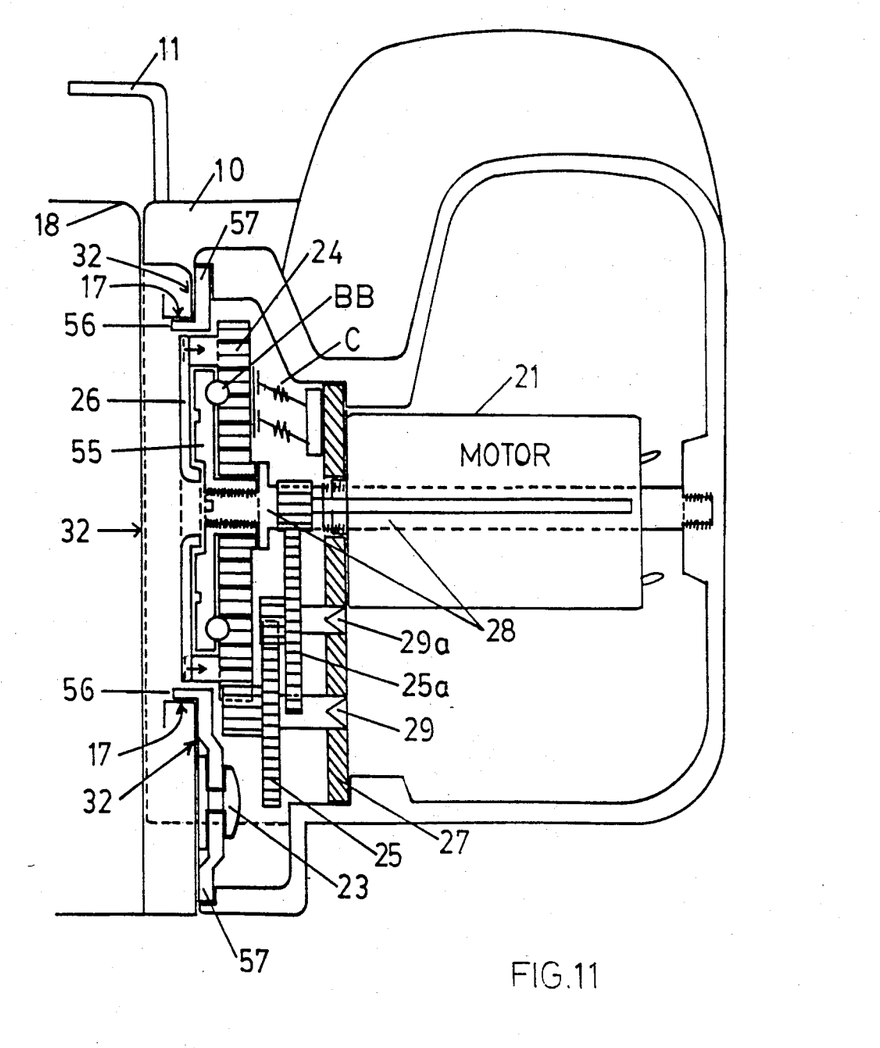
FIG. 11 shows a scaled-up top sectional view of the parts of the winder assembly.

The winder body contains the direct, simple and effective drive assembly of an electric micro-motor 21 and a reduction gearing of pinion/gears 25 and 25a, the last stage large diameter gear 24, and adaptor bayonet plate 26 via plate 27 whereon the components are assembled. As shown in FIG. 11, the gear and pinion 25a is first mounted on the plate 27 at 29a then followed by gear/pinion 25 at 29. The motor and pinion 21 is next bolted onto the plate 27 and in turn, bolted onto the winder 10 chassis. Shaft 28 mounted through at plate 27 to the other end of the chassis 10 enabling stronger support characteristics. The large gear 24 is then placed in position on shaft 28 with an arrangement of ball-bearings BB retained and securely attached by plate 55, allowing for free rotation, thus reducing load friction, while supporting the camera assembly and weight through bayonet plate 26 attached on gear 24. On the other face of the large gear 24 is provided a cam-lever electric circuit breaker C which engages a cam surface on the face of the gear 24. When the gear 24 completes a full cycle, coinciding with a full winding cycle of the camera, the cam surface engages the circuit breaker C discontinuing power to the micro-motor 21, thereby stopping the winder upon completion of a full camera film winding operation.

Figure 12:
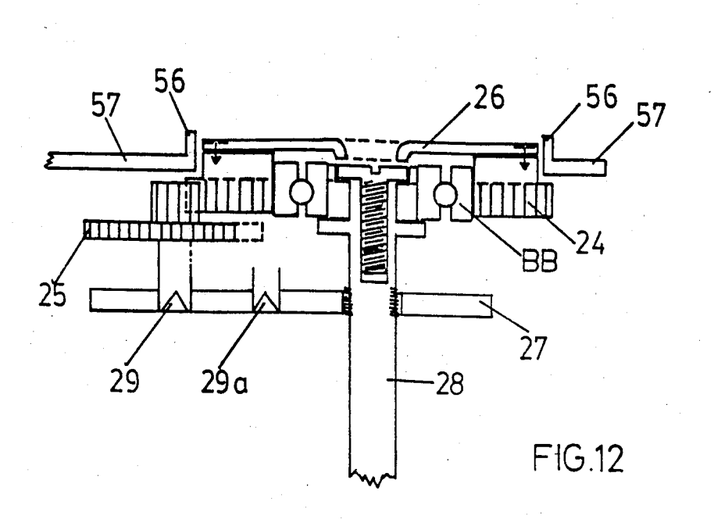
FIG. 12 shows another variation of the ball-bearing in the large gear.
Figure 13:
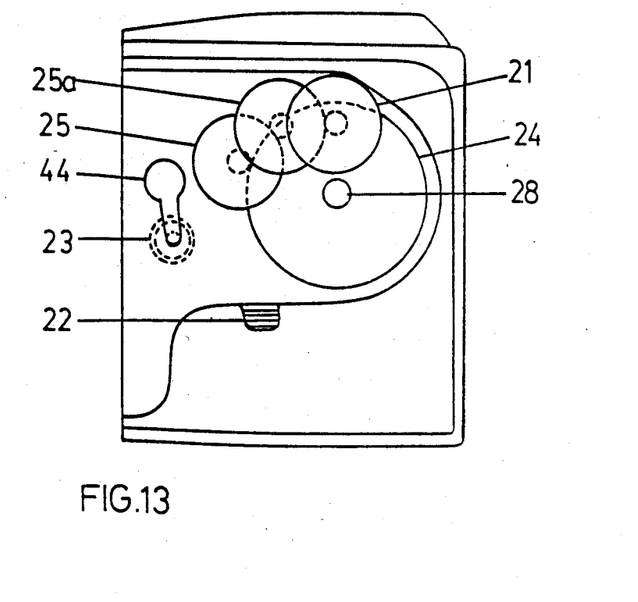
FIG. 13 shows the position of the assembly of the motor, reduction gearing and attachment to the camera strap lug.
Figure 14:
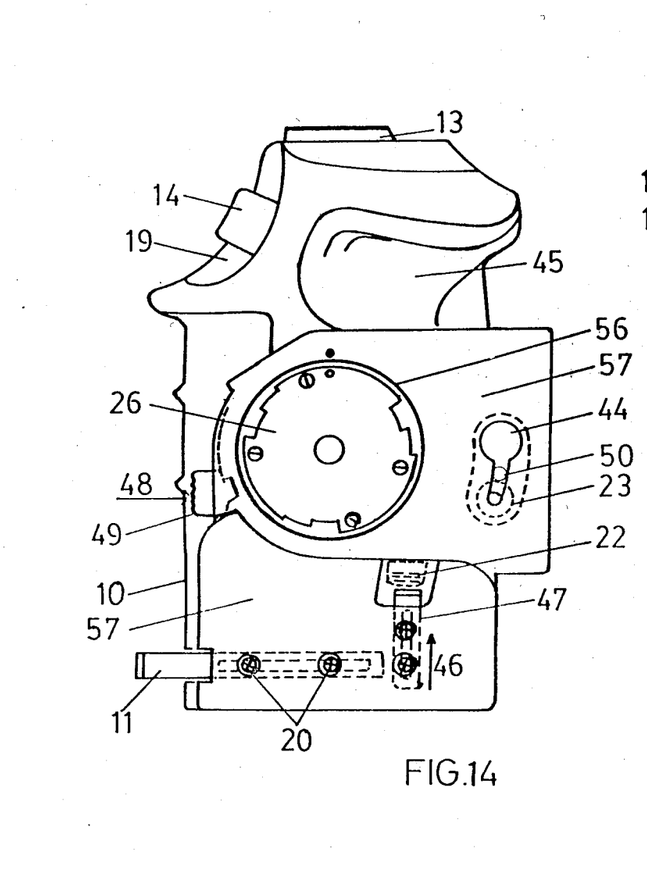
FIG. 14 shows the winder at the attachment side thereof and the L-shaped arm at the standard position of the normal camera shutter release button.

The arrangements to the gearing system as described above and illustrated in FIGS. 11, 12 and 13, shows the direct simplicity, high efficiency and effectiveness of the use of straight spur gears of conventional design to achieve the objective. It should be apparent that variations of this drive arrangement may be employed, for example, the inclusion of a further reduction gearing step and different placement of the drive.

Figure 2:
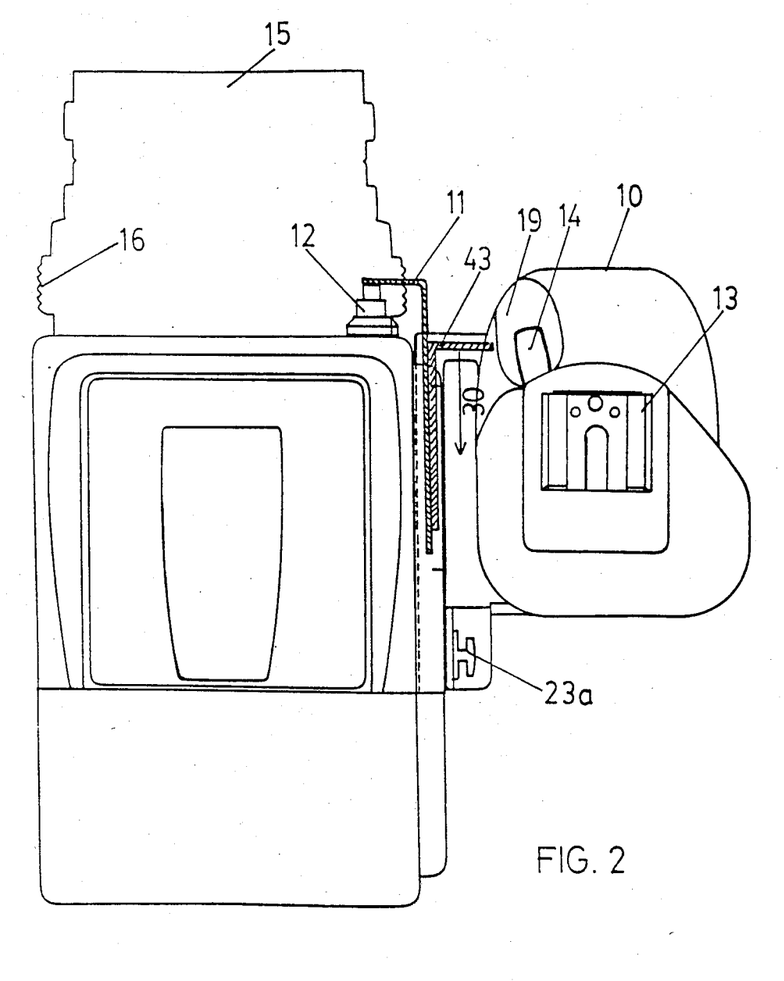
FIG. 2 shows a plan view of the adjustable and/or interchangeable mechanical trigger L-shaped arm of the winder in position relative to the camera shutter release button.
Figure 3:
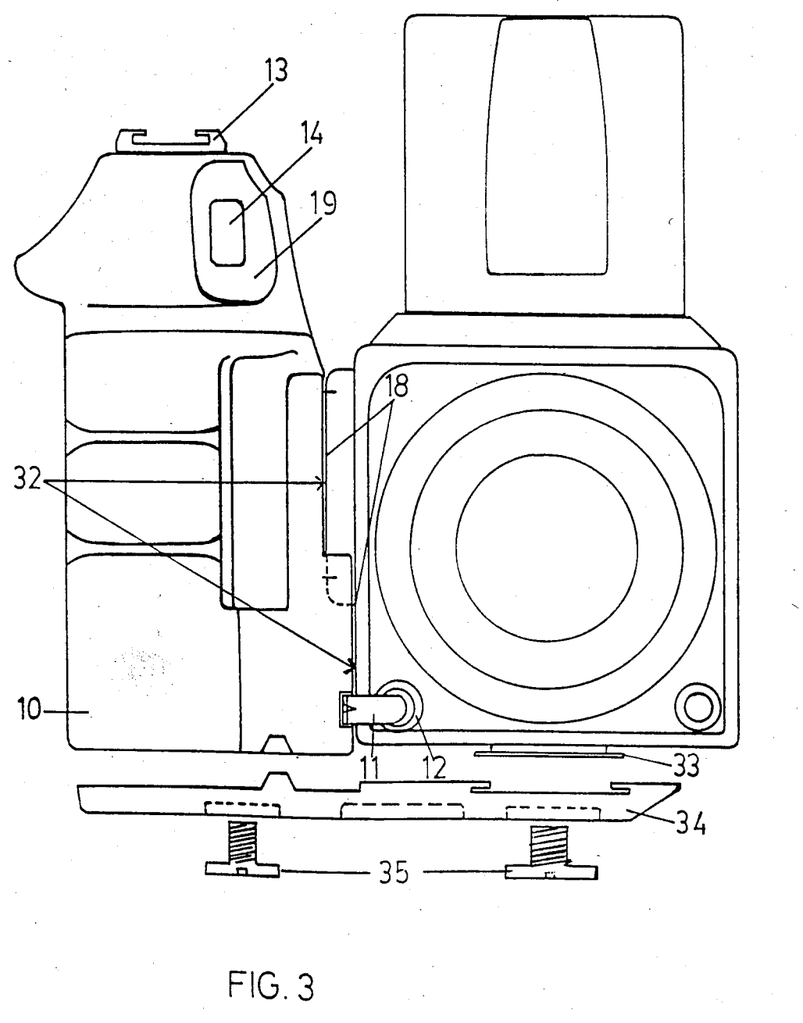
FIG. 3 shows a front view of the winder/camera and an optional base plate for sturdier mounting.
Figure 4:
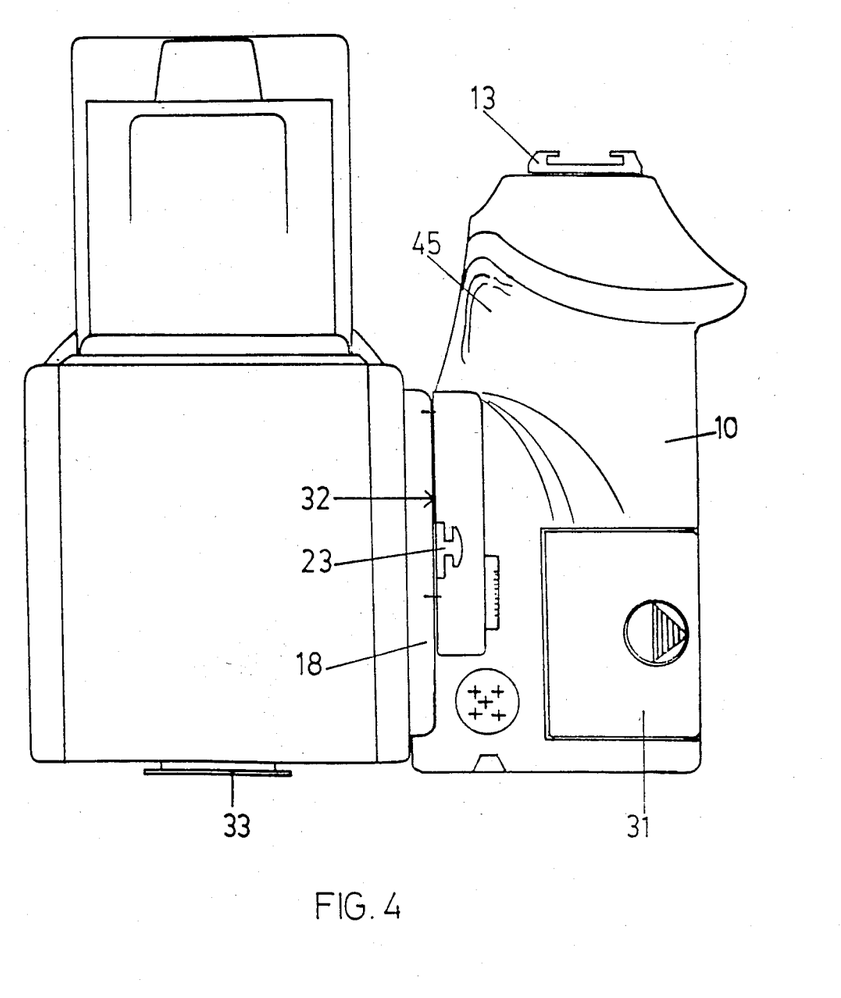
FIG. 4 shows a rear view of the winder and camera.
Figure 5:
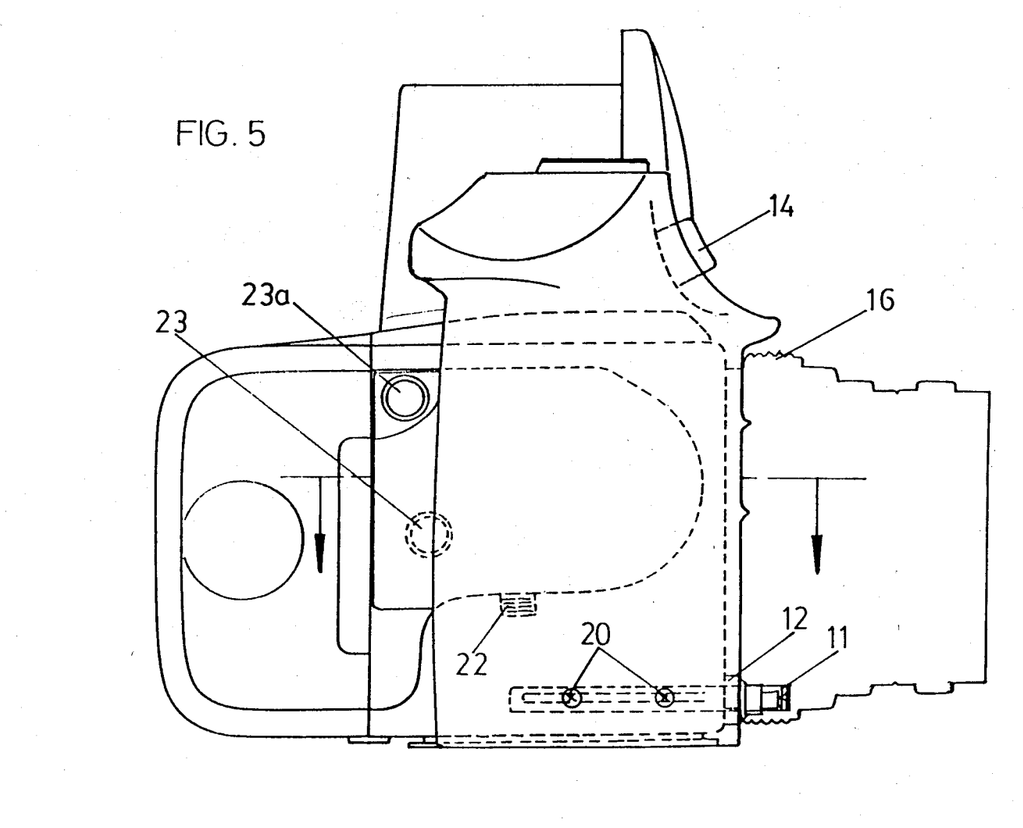
FIG. 5 shows a side view of the winder mounted to the camera and the position of the winder trigger arm in position with the shutter button of the camera.
Figure 9:
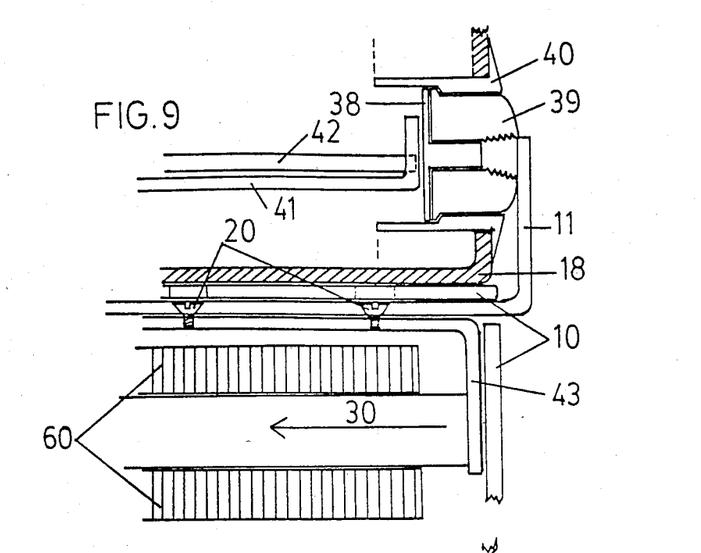
FIG. 9 illustrates a top sectional view of the adjusted winder mechanical trigger arm in position with the modified shutter release button for the camera.
Figure 10:
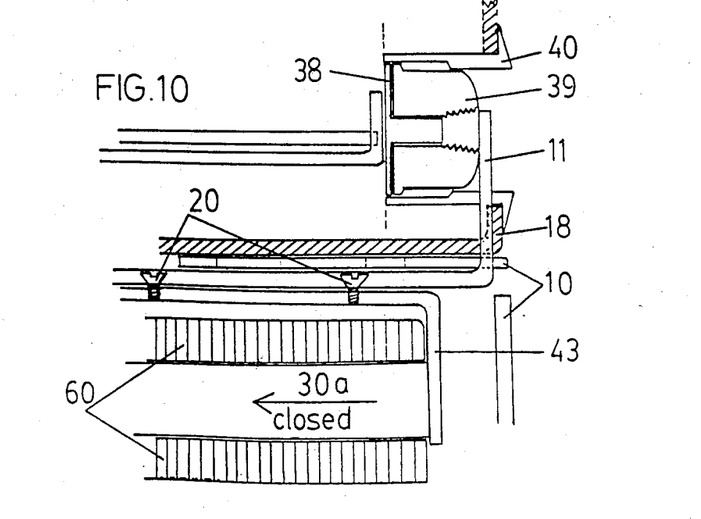
FIG. 10 is similar to FIG. 9 in which the shutter button is held in the triggered position by the L-shaped arm with a solenoid in a closed position.
Figure 16:
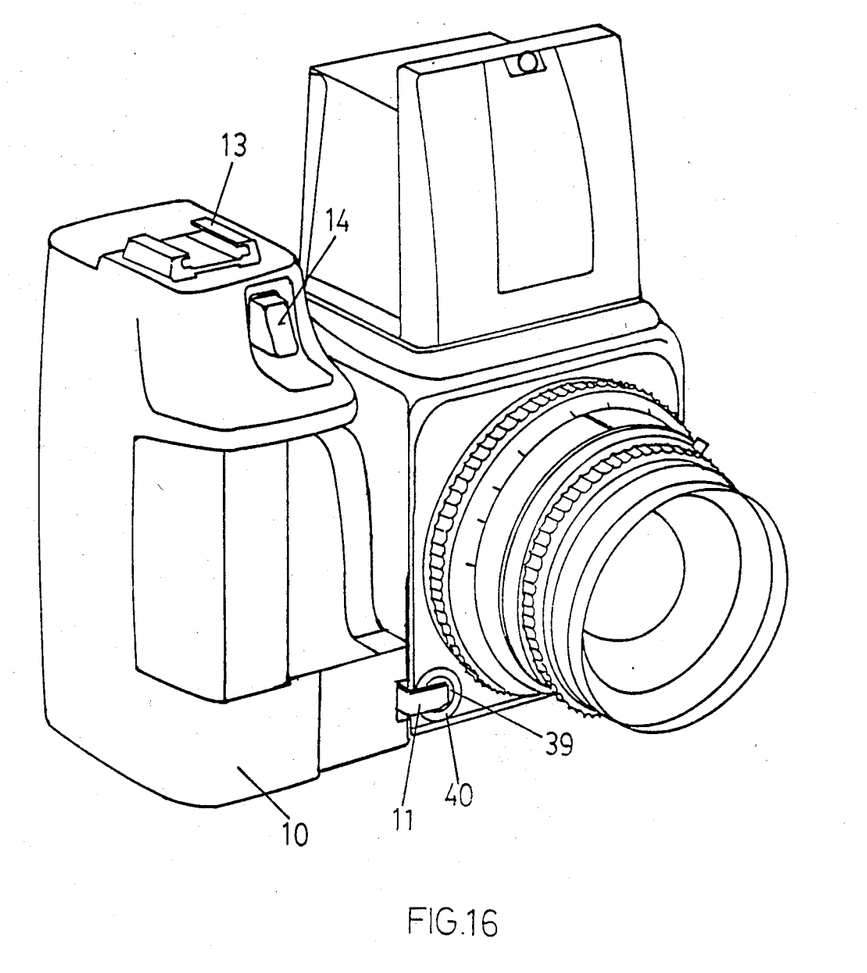
FIG. 16 shows a perspective view of another version of the winder attached to the camera with the modified shutter button.
Figure 17:
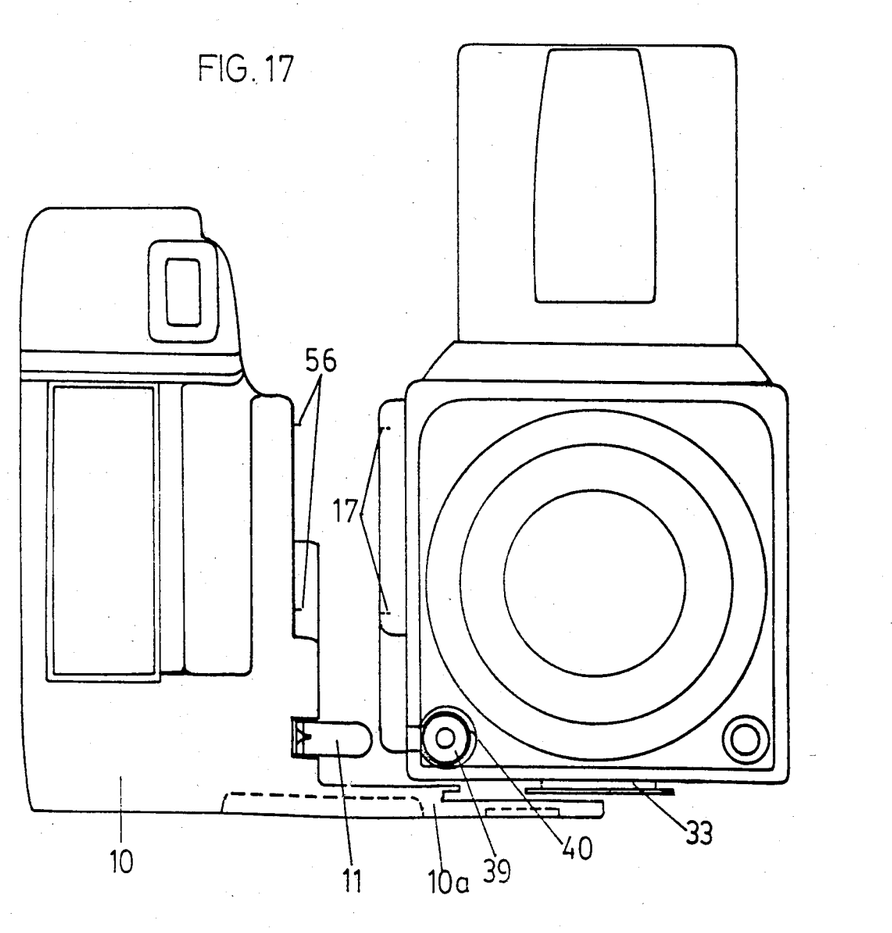
FIG. 17 shows a front view of FIG. 16 with a version of a fixed L-shaped configuration.
Figures 18, 20:
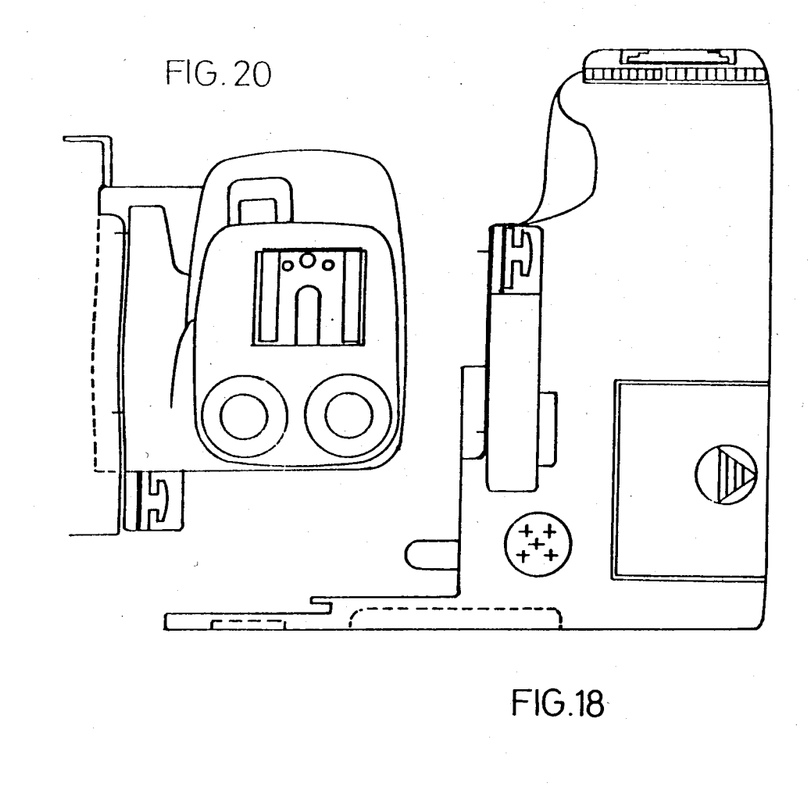
FIG. 18 shows a rear view of the winder/camera of FIG. 16.
FIG. 20 shows a plan view of the winder of FIG. 16.
Figure 19:
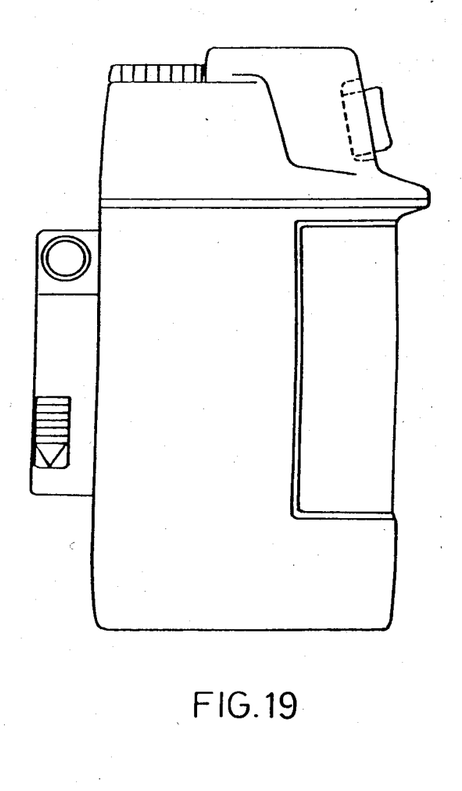
FIG. 19 shows a side profile of the winder/camera of FIG. 16.

The winder's electromagnetic control release button 14 lies in a concave groove 19 of a natural finger rest which guards against inadvertent release, and activates a solenoid 60 to trigger the camera shutter button 12 during exposure via the adjustable L-shaped arm 11 of the winder in the direction of arrow 30 of FIGS. 2 and 5. The adjustability of the arm 11 is of valuable and practical importance as illustrated in FIGS. 9 and 10, in which the arm 11 is situated in a new position corresponding to the optional modified shutter release button with components 38, 39 and 40, which, when assembled, is flush with the camera body as illustrated in FIGS. 9 and 16. For example, the maximum protrusion of the modified shutter release is about 3 mm as contrasting to the 11 mm protrusion of the standard shutter release button 12 of FIGS. 2 and 5, which would impede the free flow of turning the focusing ring 16 of the lens 15 close to the camera body by the left hand fingers used in conjunction with the right hand hold winder.

Figure 1:
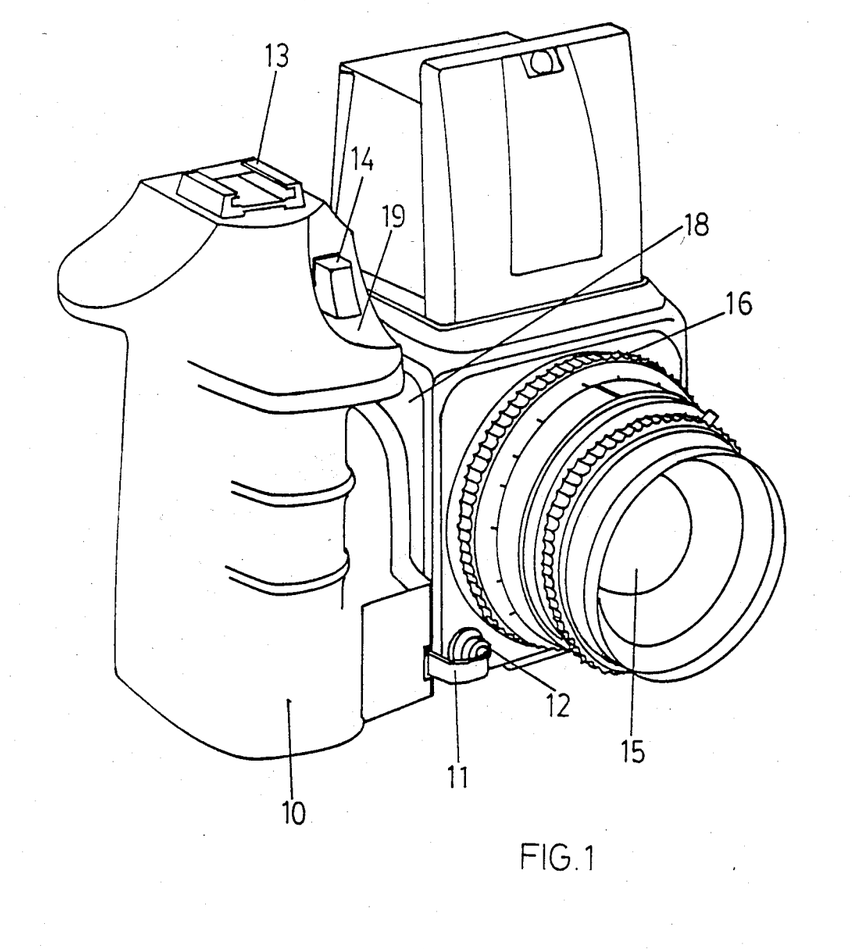
FIG. 1 shows, in perspective view, the anatomical I-shaped winder attached to a camera to form a smooth integrated unit.

The position of the adjustable trigger arm 11 side-mounted on the winder as shown in FIG. 1, greatly helps in the overall concept of the I-shaped winder, particularly, the method of easy mounting, locking, use, good ergonomics and handling and positive balance in hold, and especially in conjunction with the preferred optional modified shutter release in FIGS. 6–10. In effect, it permits smooth focusing action of the lenses with the left hand fingers while the right hand holds the winder's entire weight, therefore not contributing any further undesirable moments to the camera center of gravity. The snug fitting contoured right thumb rest 45 provides excellent balance against the moments of the camera set.

Figures 6, 7, 8:
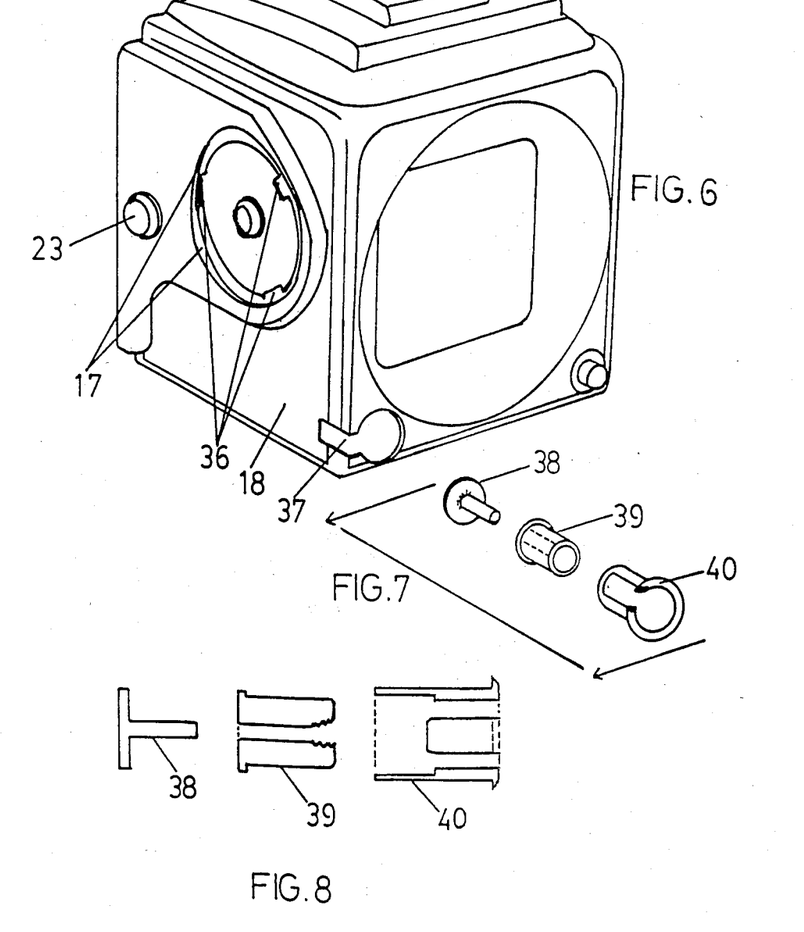
FIG. 6 shows the camera with an optional modified slot at the shutter release position.
FIG. 7 shows the component parts of the modified shutter release configuration.
FIG. 8 illustrates a sectional view of FIG. 7.

The preferred and improved modified shutter release button necessitates a modification of the camera body 18 at 37, which involves a procedure of dismantling the outer body shell from the inner mirror box. The standard shutter button 12 is removed and in its place the hole is made larger to accept the modified shutter release button component 40. The hole has a right angle slot 37 formed therein to allow the required triggering depth and width of the adjustable arm 11. Similarly, a slot in the shutter release button component 40 should be aligned to the slot 37 on the camera body and glued with epoxy adhesive as shown in FIGS. 6 and 7. The other components 38 and 39 are then assembled as shown in FIG. 9, and the installation is completed by reassembling the body shell and the mirror box. The shutter components 38 and 39, which are mobile inside the component 40 transfer the trigger action, when activated, to trigger the levers 41 and 42 of the mirror box that starts the exposure cycle. The required trigger distance movement is about 3.5 mm and is shallow of about 1.5 mm for the left index finger to manually depress beyond the component 40 which is the shutter guard ring of a diameter of 11–12 mm after the initial protrusion of 2 mm. Alternatively, an add-on extension button to protrude further outward is provided by attaching onto the component 39. However, no change is necessary for the winder with the adjustable arm 11. Adjustability is achieved by the use of two screws 20 or similar means to lock the change of its position in relation to the solenoid activated arm 43. A slot is provided in the arm, at which the screws 20 can be tightened at any position along the slot. Alternatively, different sized arms can be interchanged.

Another solenoid activated adjustable mechanical trigger arm 47 is used to set the camera pre-release lever 22 which opens the auxiliary shutter, stop down the aperture and close the lens shutter. Operation of the pre-release button is indicated by the direction of the arrow 46 by the arm 47 triggered by the solenoid. The method of adjustability of the shutter trigger arm 11 is applied here for the arm 47 which would be adjusted for the slightly longer pre-release button 22a of the newer cameras shown in FIG. 15.

With the two mechanical arms 11 and 47 for triggering the camera shutter release button 12 and the pre-release lever 22, respectively, and these arms themselves being triggered by two corresponding L-shaped arms (not shown but in the area of arms 11 and 47) activated by the solenoid 60 by an electric circuit of known design, it is possible to have an arrangement to operate the camera shutter button and the pre-release lever in a number of interesting and useful combinations in the shutter release function modes, for example:

A. Normal release for single exposures
B. Pre-release first, followed by shutter release OFF-/ON feature
C. Automatic pre-release activated after the normal film advance, shutter tensioning cycle
D. For continuous exposure Such electronic circuitry is housed in the winder body and performing these functions may be designed by a person skilled in the art.

At the top of the winder, an accessory shoe 13 is provided to hold a flash attachment, etc., and additional or optional extra strength mounting is provided by a lightweight, thin, strong base plate 34 to the base of the winder and camera's tripod plate 33 with recessed screws 35 or other quick release/lock means.

Such a base plate may be pivotally attached to the winder by means of a hinge. The winder would initially be attached to the camera as described above, then the base plate is swung on its hinge to a position where it can be attached to the camera tripod hole, as described above in relation to base plate 34.

Numerous alterations of the structure herein described will suggest themselves to those skilled in the art. However, it is to be understood that the present embodiment of the invention is for purposes of illustration only and not to be construed as a limitation of the invention. All such modifications which do not depart from the spirit of the invention are intended to be included within the scope of the appended claims.

What is claimed is:

1. A detachable electronic motor winder arranged for use with a camera having a manually operated winding mechanism and shutter release, the winder comprising a generally rectangular body which is adapted to be connected to a surface of the camera provided with the winding mechanism whereby a substantial portion of one side of the body is flush mounted with the surface of the camera enabling an operator to stably support the camera in use, the body containing a drive assembly arranged to be coupled to the camera winding mechanism for enabling winding of film, an electromechanically operable actuator arranged to operate the camera shutter release, a battery compartment for receiving batteries to energize the winder, electric circuitry connected to the batteries for controlling start and stop operation of the winder, and a manually operable control button for activating the drive assembly and actuator through the electric circuitry.

2. A winder as claimed in claim 1, wherein said drive assembly comprises an electric motor, reduction gearing connected to a shaft of the motor, and an adaptor, said adaptor being lockably engagable with the camera winding mechanism and is driven by said reduction gearing in order to enable film to be wound and to attach the side of the body to the camera surface.

3. A winder as claimed in claim 2, wherein said reduction gearing is coupled to said adaptor through ball bearing means, and said drive assembly further includes a raised circular ring surrounding the adaptor for snugly engaging a hold surrounding the camera winding mechanism.

4. A winder as claimed in claim 3, wherein reduction gearing further includes a pinion mounted on the electric motor which drives a first gear having a first pinion, the first pinion driving a second gear having a second pinion, and the second pinion of the second gear being arranged to directly drive the camera winding mechanism through the adaptor.

5. A winder as claimed in claim 1, wherein the body is provided with a keyhold recess in the side which attaches to the camera surface, the keyhole recess being arranged to receive a lug therein which projects from the camera surface, the lug fitting into the recess through a large opening of the keyhole, the body being twistable through an angle about the winding mechanism relative to the camera to cause the lug to slide into the smaller portion of the keyhole in order to firmly lock the winder to the camera.

6. A winder as claimed in claim 5, wherein a mechanical switch is provided on the body operable to move a lever between a first position in which the lever engages said drive assembly to prevent motion thereof, and a second position in which the lever is arranged to engage any lug projecting into the keyhole recess thereby keeping the lug locked in the recess.

7. A winder as claimed in claim 1, wherein the electromechanically operable actuator is an L-shaped arm which extends from the body and is arranged to operate the manual shutter release button of the camera on operation of a solenoid.

8. A winder as claimed in claim 7, wherein the L-shaped arm is adjustable in length for different projecting distances of the camera shutter release button.

9. A winder as claimed in claim 7, wherein the L-shaped arm is detachable from the winder allowing replacement thereof by different arms of differing lengths allowing for respectively differing projecting distances of the camera shutter release button.

10. A winder as claimed in claim 7, wherein the L-shaped arm is mounted on the side of the body flush with the camera surface.

11. A winder as claimed in claim 1, wherein the body is provided with a further electromechanically operable actuator arranged to operate a pre-release mechanism of the camera, the further actuator being operable in response to operation of the manual control button.

12. A winder as claimed in claim 1, wherein said body has a rectangular I-shaped configuration and is anatomically shaped to fit an operator's hand, whereby to enable ease of gripping the winder.

13. A winder as claimed in claim 1, wherein a flash unit mounting is provided on an upper surface of said body.

14. A winder as claimed in claim 1, wherein said body further comprises a base plate pivotally mounted thereto by a hinge, whereby when the body is attached to a camera, the base plate is arranged to pivot about the hinge until it is flush with the camera base and is then attached thereto providing further stability for the winder mounting.

15. A winder as claimed in claim 1, wherein the camera to which the winder is attachable is a Hasselblad model 500c or 500c/m.

* * * * *